US007648088B2

(12) United States Patent
Eikelenberg et al.

(10) Patent No.: US 7,648,088 B2
(45) Date of Patent: Jan. 19, 2010

(54) CHEESE GRATER

(75) Inventors: Ralph F. E. Eikelenberg, Gooik (BE); Jan-Hendrik de Groote, Haaltert (BE)

(73) Assignee: Dart Industries Inc., Orlando, FL (US)

( * ) Notice: Subject to any disclaimer, the term of this patent is extended or adjusted under 35 U.S.C. 154(b) by 10 days.

(21) Appl. No.: 11/892,590

(22) Filed: Aug. 24, 2007

(65) Prior Publication Data

US 2009/0050723 A1 Feb. 26, 2009

(51) Int. Cl.
  *A47J 43/25* (2006.01)
(52) U.S. Cl. .................... 241/30; 241/88.1; 241/95; 241/168; 241/273.2
(58) Field of Classification Search ............ 241/273.2, 241/88.1, 95, 89.4, 169.1, 168, 30, 169; 99/510
  See application file for complete search history.

(56) References Cited

U.S. PATENT DOCUMENTS

| 926,327 | A | * | 6/1909 | Hoffman ................. 241/273.2 |
|---|---|---|---|---|
| 2,602,596 | A | | 7/1952 | Jones et al. |
| 2,818,797 | A | | 1/1958 | Ballor |
| 3,552,460 | A | * | 1/1971 | Cooney ................. 241/169.1 |
| 3,642,045 | A | | 2/1972 | Buvelot |
| 4,127,375 | A | | 11/1978 | Nelson |
| 4,212,430 | A | | 7/1980 | Dale et al. |
| 4,714,205 | A | | 12/1987 | Steinko |
| 5,071,663 | A | | 12/1991 | Dugan |
| 5,261,613 | A | | 11/1993 | Mullarky |
| 5,967,434 | A | | 10/1999 | Virk |
| 6,520,436 | B1 | | 2/2003 | Herren |
| 6,966,510 | B2 | | 11/2005 | Pai |
| 7,204,440 | B2 | * | 4/2007 | Fouse et al. ................. 241/95 |
| 2005/0040265 | A1 | | 2/2005 | Pai |
| 2005/0160894 | A1 | | 7/2005 | Canegallo |

FOREIGN PATENT DOCUMENTS

| DE | 20 2006 016 198 | 4/2007 |
|---|---|---|
| EP | 1 018 920 B1 | 3/2004 |
| FR | 2685863 | 7/1993 |
| JP | 2005186267 | 7/2005 |
| WO | WO 2008/019426 | 2/2008 |

\* cited by examiner

*Primary Examiner*—Mark Rosenbaum
(74) *Attorney, Agent, or Firm*—John A. Doninger

(57) ABSTRACT

The invention provides a food grater assembly comprising a base; an external cylindrical portion removably attached to the base; a grater disc disposed within and removably attached to the lower end of the outer cylindrical portion; an inner divider having a cross wall dividing the inner space of the inner cylindrical portion in two equal portions; said divider being able to rotate freely within the external cylindrical portion; a plunger disposed within the divider, said plunger having a plurality of annular ridges disposed along a portion of its length; said plunger portion having a closed bottom wall and a slot defined axially and longitudinally along a portion of is length; a pair of engaging strips flexibly attached to and disposed in the wall of the external cylinder, each of said engaging strips having horizontal ridges along a portion of the inner surface thereof for engaging and disengaging the horizontal ridges of the plunger; and a cap disposed on the upper end of the inner plunger portion.

10 Claims, 5 Drawing Sheets

CHEESE GRATER

BACKGROUND OF THE INVENTION

1. Field of the Invention

The present invention is directed toward a manually operated grater for food products, in particular hard cheese, and for dispensing such products in grated, shredded, or flaked form.

2. Description of the Related Art

Prior art food graters of the container type are commonly used to cut hard food products, such as cheese, into grated, shredded, or flaked form for consumption.

One problem associated with the prior art food graters is that they are of complex design and assembly, thus rendering them complicated to operate, and difficult to dismantle and reassemble for cleaning purposes. Their complex design also results in a limited inner space for receiving the food articles.

It is therefore a primary object of the present invention to provide a food grater of simple ergonomic design and assembly, which is simple in operation, and which is easy to fill and clean.

SUMMARY OF THE INVENTION

These problems and others are addressed by the present invention which comprises an external cylinder having a grater disc secured at the bottom of inside of the external cylinder, and a cylindrical divider having a vertical partition inserted in the external cylinder and resting on the upper surface of the grater disc. The cylindrical divider receives a cylindrical plunger having its bottom closed by a wall and a vertical slot defined in its vertical wall for receiving the vertical partition of the divider; A pair of flexible engaging strips are secured in the wall of the external cylinder. A plurality of horizontal ridges are integrally formed on the upper, inner surface of the engaging strips, and a plurality of projecting annular ribs on a portion of the outer wall of the plunger corresponds with projecting ribs on the inner surface of a pair of flexible fold-out strips attached to the outer cylinder.

BRIEF DESCRIPTION OF DRAWINGS

These and other objects of the present invention will he appreciated and understood by those skilled in the art from the detailed description of the preferred embodiments of the invention and the following drawings of which.

DETAILED DESCRIPTION OF THE INVENTION

Figure 1:
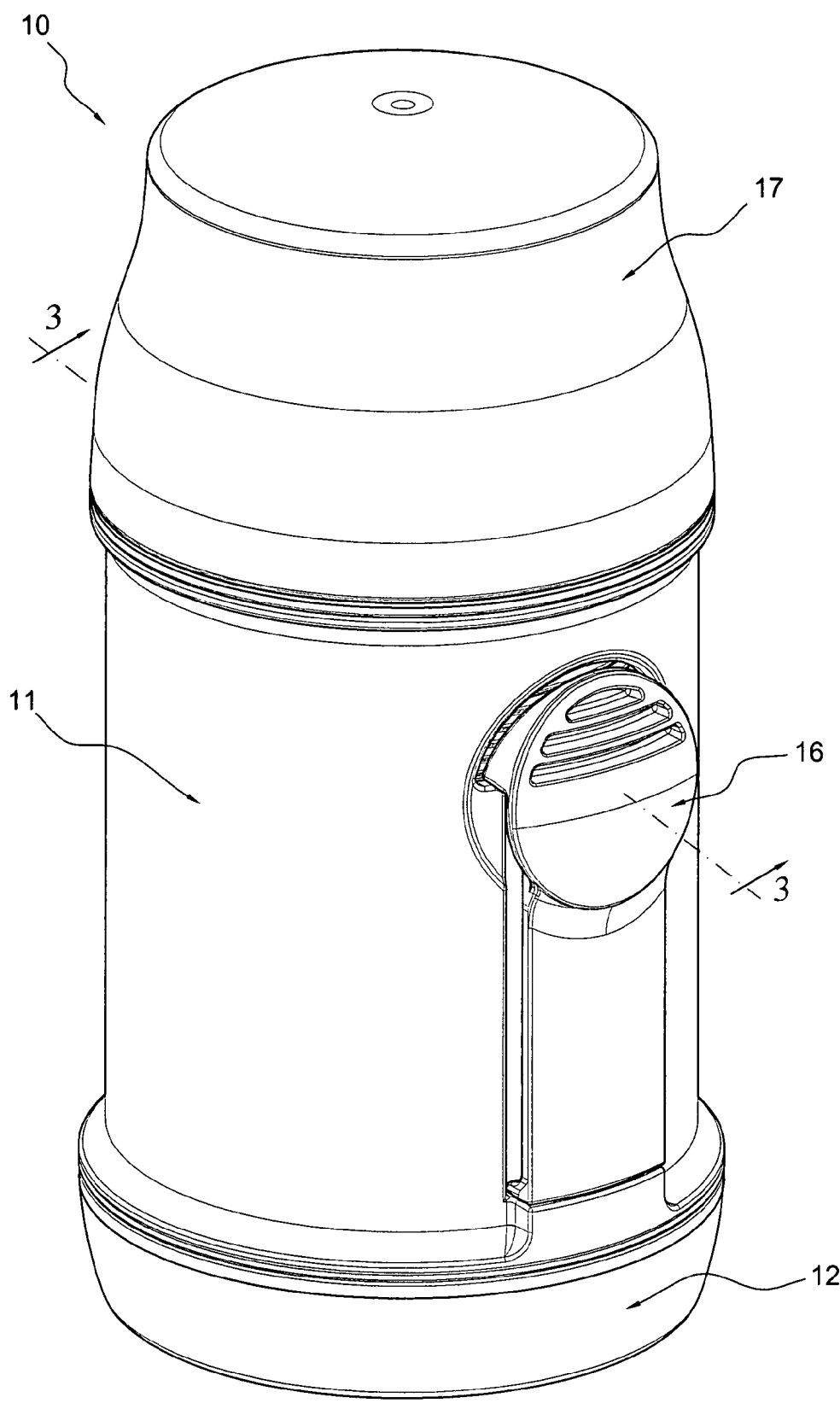
FIG. 1 is a top perspective view of the cheese grater assembly according the present invention.

Referring now to FIGS. 1-6, wherein the showings are for the purpose of illustrating the preferred embodiment of the invention only and not for the purpose of limiting the same, the cheese grater assembly of the invention is generally shown 10 which comprises an external cylinder 11, a base 12, a grater disc 13, a divider 14, a plunger 15, a pair of opposing engaging strips 16, and cap 17.

Figure 2:
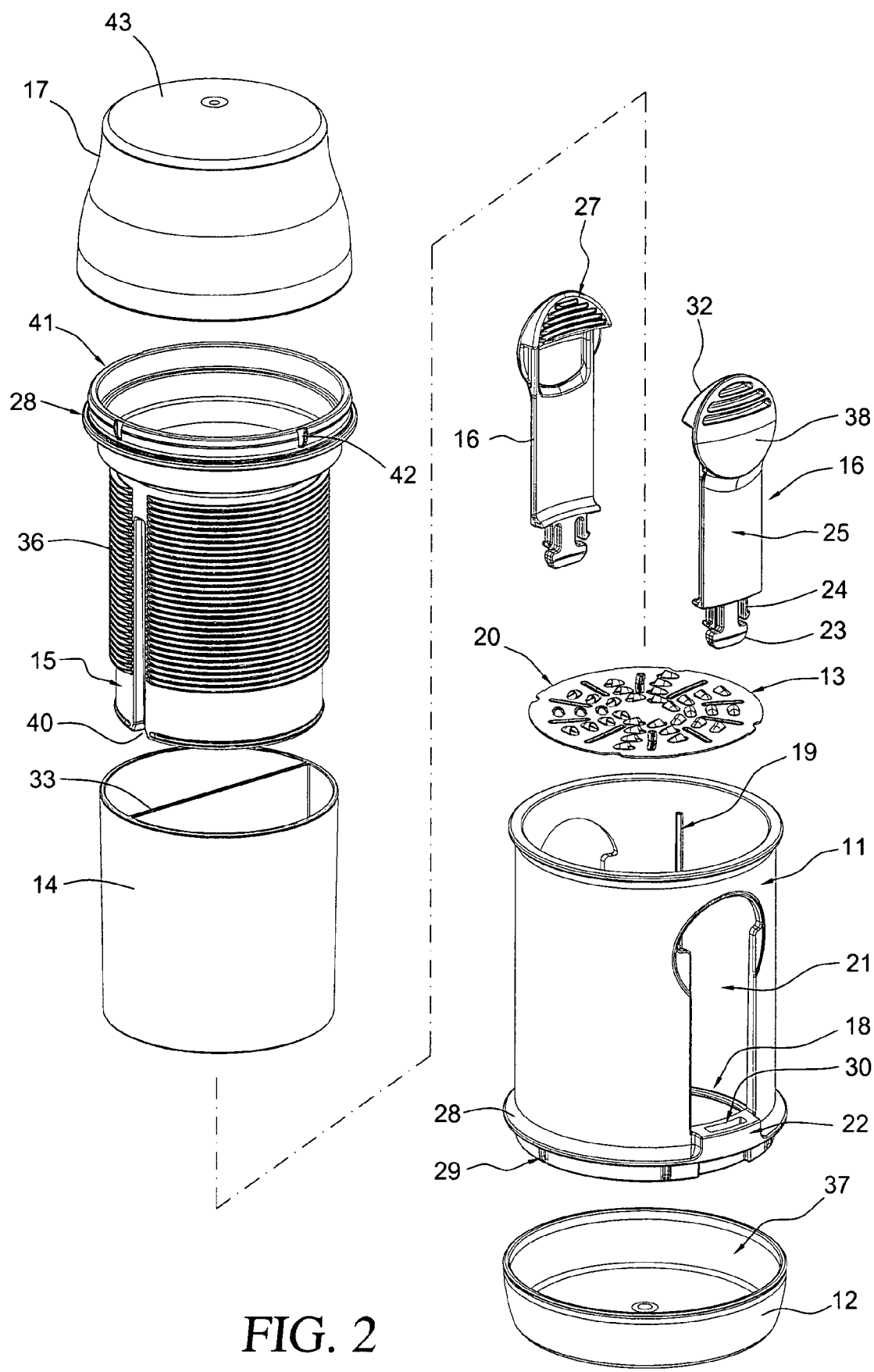
FIG. 2 is an exploded perspective view of the cheese grater assembly according to FIG. 1.

Referring now to FIG. 2, the components of the cheese grater assembly 10 are shown separated from each other. The external cylinder 11 is a hollow cylinder having a blocking edge 18 for supporting the grater disc 13 thereon once placed inside the external cylinder 11. A plurality of vertical ribs 19 are integrally formed with and protrude outwardly from the inner wall of the external cylinder 11 for engaging with the corresponding plurality of notches 20 formed at the peripheral edge of the grater disc 13. The plurality of vertical ribs 19 extend from the blocking edge 18 along a substantial portion of the inner surface of external cylinder 11. When the grater disc 13 is seated on the blocking edge 18, engagement of the notches 20 with the plurality of the vertical ribs 19 prevents rotation of the grater disc 13 within the external cylinder 11. In this way, the grater disc 13 is removably fixed onto the bottom of external cylinder 11, and is easily removed for cleaning purposes.

An annular flange 28 is integrally formed with and extends outwardly from the outer surface of external cylinder 11 at a position proximate to the lower end of external cylinder 11. Below the annular flange 28, a plurality of projections 29 are integrally formed on the outer surface of external cylinder 11 for cooperating and engaging with the inner surface 37 of base 12. The inside diameter of base 12 is larger than the outside diameter of the external cylinder 11 below annular ridge 28, such that base 12 fits snuggly onto projections 29. Movement of the base 12 onto external cylinder 11 is limited by the upper peripheral edge of base 12 coming into contact with the lower peripheral edge of annular ridge 28.

A pair of diametrically opposed cut-outs 21 is formed in the wall of external cylinder 11 for receiving a portion of engaging strips 16. A housing 22 having an inner lumen 30, which is substantially rectangular in cross-section, is formed on the outer surface of external cylinder 11 at the lower end of each cut-out 21. The housing 22 removable secures the lower end the engaging strip 16 on the external cylinder 11.

The engaging strips 16 each comprises an elongate central portion 25, and a lower end comprising a central and generally T-shaped retaining tab 23 extending downwardly and disposed between a pair of flexible retaining lugs 24 each having a projection 31 extending outwardly from a lower tip thereof. The top end of engaging strips 16 widens into a substantially circular portion 38. The inner surface of the circular portion 38 comprises an angular projection 32 bearing a plurality of integrally formed horizontal ridges or threads 27.

Each engaging strip 16 is snap-fitted onto the external cylinder 11 by inserting the generally T-shaped retaining tab 23 and retaining lugs 24 into the lumen 30 of housing 22, until projections 31 engage the lower surface of housing 22, thus flexibly retaining the engaging strip 16 on external cylinder 11. Such engagement allows for a degree of flexibility and movement inwardly and outwardly of the engaging strip 16 within the cut-out 21, which, as will be explained in greater detail herein, provides for engagement of the engaging strips 16 with the outer surface of the plunger 15 when the engaging strips are pressed and flexed inwardly by a user.

A cylindrical divider 14 is disposed within and rotates freely within external cylinder 11. The bottom edge of the cylindrical divider 14 rests on the peripheral edge of the upper surface of grater disk 13. The top edge of the cylindrical divider 14 is located below the level of the angular projection 32 of the engaging strips 16 when the engaging strips 16 are assembled on the external cylinder 11. The cylindrical divider 14 includes a cross wall 33 extending substantially the height of the cylindrical divider 14 and extending laterally in a middle section thereof dividing the inner space of the cylindrical divider 14 into two equal spaces.

Figure 3:
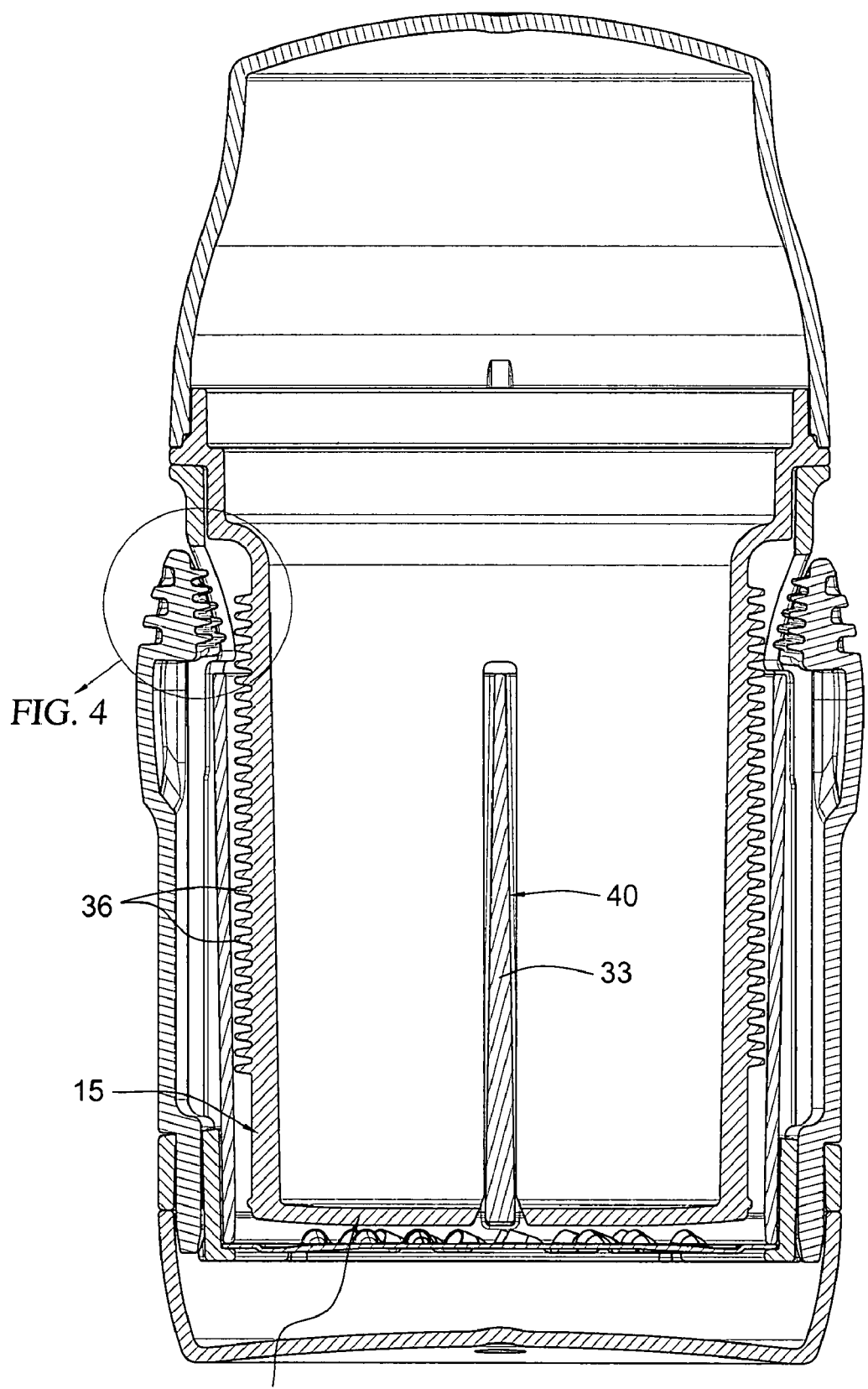
FIG. 3 is a cross sectional view taken along line 3-3 of FIG. 1.
Figure 5:
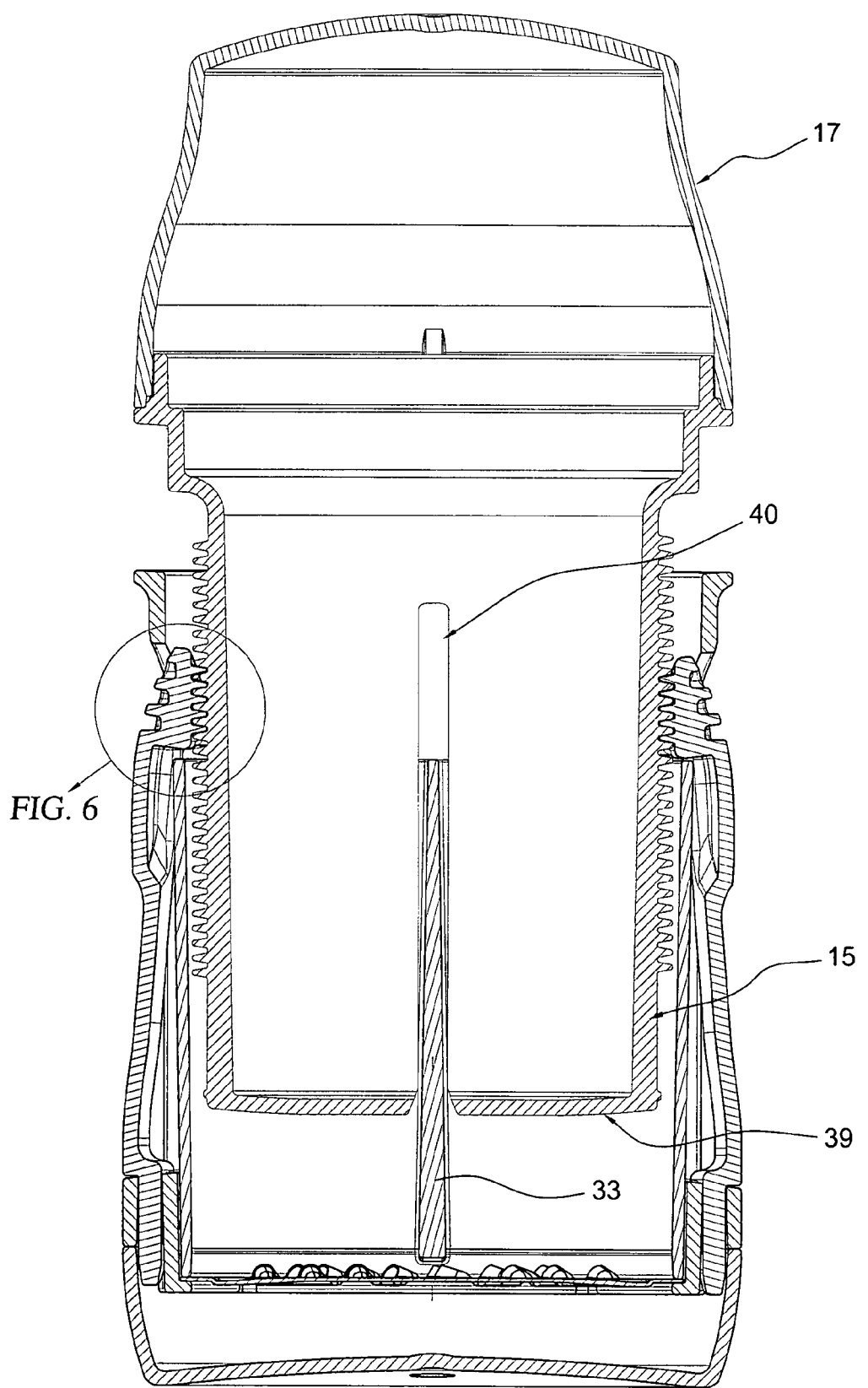
FIG. 5 is a cross sectional view showing strips disengaged.

Referring now to FIGS. 2, 3, and 5, the cylindrical plunger 15 is a hollow cylinder having a lower portion with an outside diameter slightly smaller than the inside diameter of divider 14. The lower end of the cylindrical plunger 15 is closed by wall 39, and a slot 40 is defined axially and longitudinally along a portion of the lower portion of cylindrical plunger 15, for receiving the cross wall 33 of cylindrical divider 14.

A plurality of horizontal annular ridges 36 are integrally formed with and project from a substantial portion of the outer surface of cylindrical plunger 15. The top end of the cylindrical plunger 15 widens into an opening or mouth that includes an annular flange 28 integrally formed with and extending upwardly from a peripheral edge of the upper portion of the cylindrical plunger 15. The annular flange 28 is bounded by an annular wall 41 integrally formed with and extending upwardly from a peripheral edge of the annular flange 28. A plurality of recesses 42 are formed in the outer surface of the annular wall 41.

The cap 17 includes a closed top portion 43 and an open lower portion that snap fits over the annular wall 41 of the plunger 15. The cap 17 further includes a plurality of tabs integrally formed with and extending from the inside peripheral edge of the lower portion of the cap 17 for coupling with the plurality of recesses 42 in the outer surface of the annular wall 41 of the plunger 15. When the cap 17 is seated on annular flange 28 of the plunger 15, slight rotation of the cap 17 on the plunger 15 causes the plurality of notches 20 to engage with the plurality of recesses 42 in the annular wall 41, thus preventing further rotation of the cap 17 about the plunger 15. In this way, the cap 17 is removably fixed onto the top the plunger 15.

Figure 6:
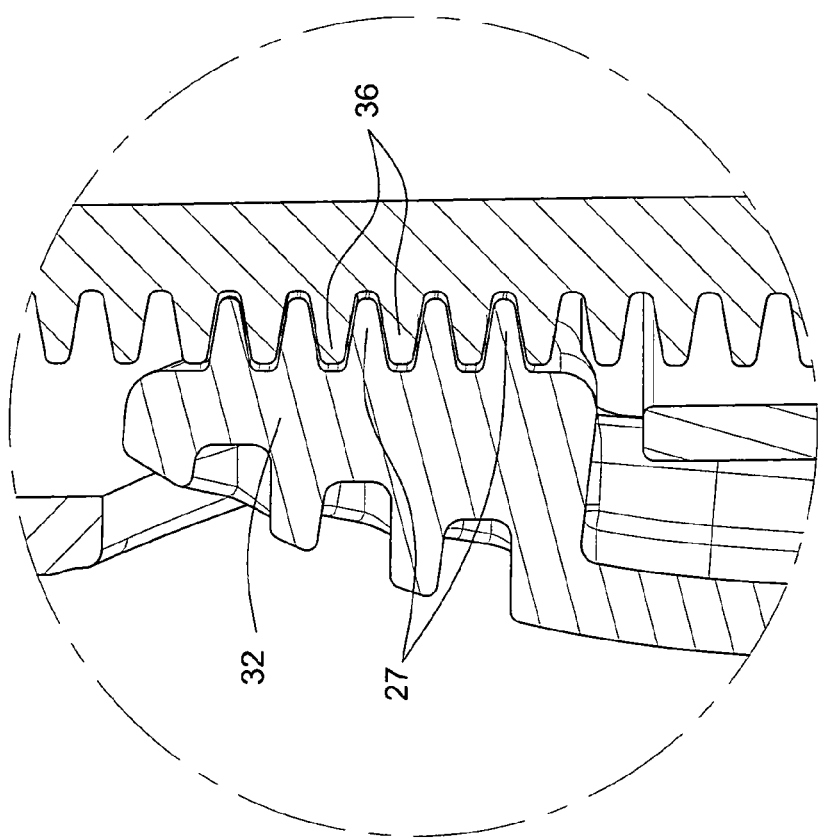
FIG. 6 is an enlarged detail view taken from FIG. 5.
Figure 4:
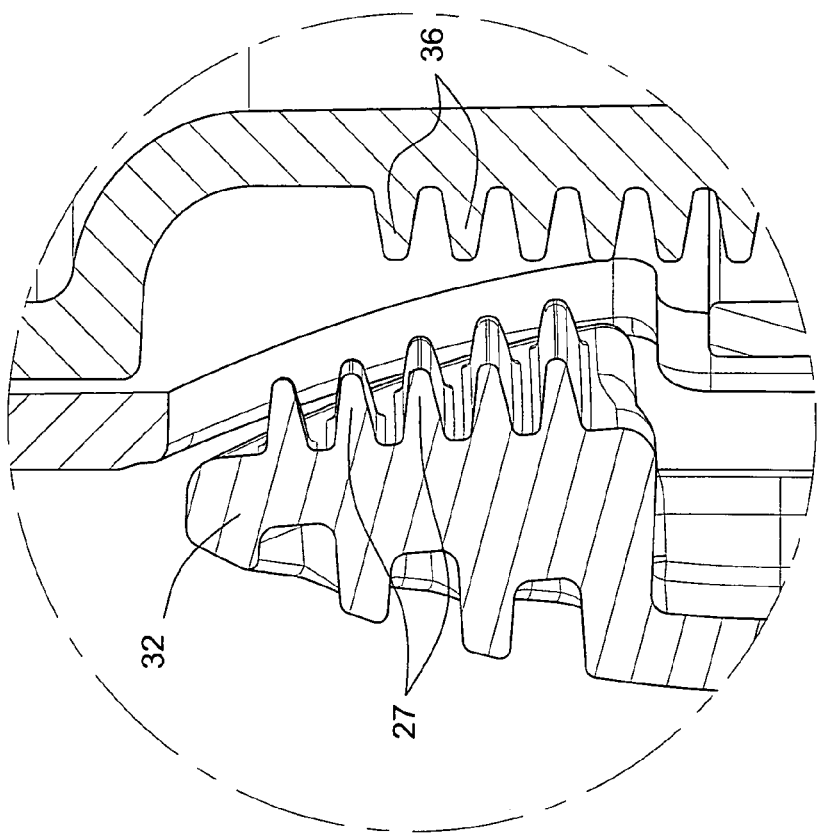
FIG. 4 is an enlarged detail view taken from FIG. 3.

Referring now to FIGS. 3 and 4, in a first, disengaged position, the flexible engaging strips 16 are positioned such that the horizontal ridges 27 on the inner surface of angular projection 32 do not engage annular ridges 36 on the outer surface of plunger 15, so that plunger 15 may move freely in a vertical direction within divider 14. Inward manual pressure on the engaging strips 16 causes engaging strips 16 to move to a second, engaged position, in which the horizontal ridges 27 on the angular projection 32 engage the annular ridges 36 on the outer surface of plunger 15, thereby preventing vertical movement of plunger 15 inside divider 14 (FIGS. 5 and 6).

To grate food, the plunger 15 is removed from external cylinder 11, and the food to be grated is introduced into the central lumen of divider 14, on one or both sides of cross wall 33. Thereafter, plunger 15 is introduced inside the divider 14, such that the cross wall 33 of the divider engages with and moves freely along slot 40. The plunger 15 will drop into divider 14 until the bottom wall 34 of plunger 15 comes into contact with the food introduced into the lumen of divider 14. Once the plunger 15 comes into contact with the food, the operator applies pressure on the top of the cap 17 to bring the food into firm contact with grating blades on the top surface of the grater disc 13, while using the other hand to grip the outside surface of the external cylinder 11 and apply inward pressure on both of the engaging strips 16, thus causing the ribs on the angular projection 31 of each engaging strip 16 to come into contact with the annular ridges 36 on the outer surface of the plunger 15. The plunger 15 is then rotated by rotating the cap 17, whereby the food to be grated is caused to rotate while being maintained in contact with the grater disc, and is expelled from the lower surface of the grater disk 13.

While preferred embodiments of the invention have been shown and described, various modifications and substitutions may be made thereto without departing from the spirit and scope of the invention. Accordingly, it is to be understood that the present invention has been described by way of illustration only, and this description should not be construed as limiting to the several claims appended hereto.

What is claimed is:

1. A food grater assembly, comprising:
   an outer hollow cylindrical portion having top and bottom openings;
   a grater disc disposed within and removably attached to the lower end of the outer cylindrical portion;
   a plunger having a plurality of ridges on an outer surface;
   a pair of engaging strips flexibly attached to and disposed in the wall of the outer hollow cylindrical portion, each of said engaging strips having a plurality of horizontal ridges along an upper portion of an inner surface thereof for engaging and disengaging the plurality of the ridges on the outer surface of the plunger to rotatably secure said plunger at a desired height.

2. The food grater assembly of claim 1, further comprising an inner cylindrical divider having a cross wall dividing the inner space of the inner cylindrical divider in two equal spaces for placing foodstuff to be grated within each space; said cylindrical divider being able to rotate freely within the outer hollow cylindrical portion.

3. The food grater of claim 2, wherein said plunger further comprises a closed bottom wall and a slot defined axially and longitudinally along a portion of is length, and wherein said cross wall is received within said slot, and wherein said bottom wall is brought in contact with the foodstuff to be grated.

4. The food grater of claim 3, wherein said outer hollow cylindrical portion further comprises a pair of opposing cut out portions each shaped and configured to substantially receive the engaging strips therewithin.

5. The food grater of claim 4, wherein each engaging strip further comprises a retaining means extending downwardly from a lower portion thereof, said hollow cylindrical portion further comprises a pair of opposing housing at a lower portion thereof for receiving said retaining means and allowing each engaging strip to flexibly move inwardly and outwardly within said cutout portion.

6. The food grater of claim 5, further comprising a cap dimensioned and configured to removably engage an upper peripheral edge of said plunger, wherein said cap is used to rotate the plunger.

7. The food grater of claim 6, wherein said plunger further comprises annular ridge on an upper periphery thereof, a plurality of recesses disposed thereon, and wherein said cap further comprises a plurality of protrusions to mate with said plurality of recesses.

8. The food grater of claim 1, further comprising a base dimensioned and configured to be removably secured to the lower end of the hollow cylindrical portion closing off the bottom opening thereof.

9. A method for grating cheese, the method comprising:
   providing an outer hollow cylindrical portion having top and bottom openings;
   providing a grater disc having upper and lower surfaces and being disposed within and removably attached to the lower end of the outer cylindrical portion;
   providing a plunger having a top end and a plurality of ridges on an outer surface;
   providing a cap removably fixed to the top end of the plunger;
   providing a pair of engaging strips flexibly attached to and disposed in the wall of the outer hollow cylindrical portion, each of said engaging strips having a plurality of horizontal ridges along an upper portion of an inner surface thereof for engaging and disengaging the plurality of the ridges on the outer surface of the plunger for rotatably securing the plunger at a desired height when being pressed against the foodstuff to be grated;

applying pressure on said cap to cause the foodstuff to come into contact with the upper surface of the grater disc;

rotating the cap and plunger while applying inward pressure on said engaging strips such that the foodstuff is grated on the grater disc and is expelled from the lower surface of the disk.

10. The cheese grating method of claim 9, further comprising:

providing an inner cylindrical divider having a cross wall dividing the inner space of the inner cylindrical divider in two equal spaces;

placing the foodstuff to be grated within each space; said cylindrical divider being able to rotate freely within the outer hollow cylindrical portion cylindrical portion.

* * * * *